United States Patent
Loper, Jr.

(10) Patent No.: US 6,339,823 B1
(45) Date of Patent: Jan. 15, 2002

(54) METHOD AND APPARATUS FOR SELECTIVE WRITING OF INCOHERENT MMX REGISTERS

(75) Inventor: Albert J. Loper, Jr., Cedar Park, TX (US)

(73) Assignee: IP-First, L.L.C., Fremont, CA (US)

(*) Notice: Subject to any disclaimer, the term of this patent is extended or adjusted under 35 U.S.C. 154(b) by 0 days.

(21) Appl. No.: 09/357,419

(22) Filed: Jul. 20, 1999

(51) Int. Cl.⁷ .................................................. G06F 12/00
(52) U.S. Cl. ........................................ 712/222; 711/165
(58) Field of Search ................................. 711/154, 165, 711/163; 712/222

(56) References Cited

U.S. PATENT DOCUMENTS

| | | | | |
|---|---|---|---|---|
| 5,944,801 A | * | 8/1999 | Gulick | 710/29 |
| 6,035,391 A | * | 3/2000 | Isaman | 712/222 |
| 6,105,129 A | * | 8/2000 | Meier | 712/222 |
| 6,112,018 A | * | 8/2000 | Tran | 712/202 |
| 6,145,049 A | * | 11/2000 | Wong | 710/267 |
| 6,269,384 B1 | * | 7/2001 | Oberman | 708/497 |

* cited by examiner

*Primary Examiner*—Eric Coleman
(74) *Attorney, Agent, or Firm*—George B. F. Yee; James W. Huffman

(57) ABSTRACT

A dual register file MMX-type architecture comprises monitoring logic for identifying which registers in a register file have been written to. The monitoring logic is coupled to write-enable logic associated with each register. Detection logic indicates the occurrence of an instruction boundary event and asserts a signal indicating the possibility of data incoherence between the register files. Control logic coupled to the register files cause a transfer of data between the two register files in response to the asserted signal. The monitoring logic acts in conjunction with the write-enable logic to disable write operations to the receiving registers when the corresponding transferring registers have not been written to.

21 Claims, 6 Drawing Sheets

Figure 6

| | | |
|---|---|---|
| L61: | finit | ; these are floating point operations |
| L611: | fldz | ; |

| | | |
|---|---|---|
| L62: | movq mm2, [esi] | ; this is an MMX operation, and since |
| L621: | movq mm1, [esi] | ; it follows a floating point operation, the |
| | | : transistion constitutes an instruction boundary |

| | | |
|---|---|---|
| L63: | add ecx, 8 | ; this is neither a floating point nor an MMX |
| | | ; operation, and thus does not constitute an |
| | | ; instuction boundary event |

| | | |
|---|---|---|
| L64: | emms | ; MMX instruction |

| | | |
|---|---|---|
| L65: | add eax,8 | ; |
| L66: | finit | ; instruction boundary |

METHOD AND APPARATUS FOR SELECTIVE WRITING OF INCOHERENT MMX REGISTERS

CROSS-REFERENCES TO RELATED APPLICATIONS

This application is related to co-pending U.S. application Ser. No. 09/349,441, filed Jul. 9, 1999, entitled "Method and Apparatus for Tracking Coherency of Dual Floating Point and MMX Register Files," and to co-pending U.S. application Ser. No. 09/344,439, filed Jun. 25, 1999, entitled "Status Register Associated With MMX Register File For Tracking Writes," both of which are commonly owned by the Assignee of the present application, the contents of both of which are incorporated herein by reference.

BACKGROUND OF THE INVENTION

The Intel Architecture™ (IA) originally provided integer instructions that operate on a set of integer registers referred to collectively as an integer register file. Early IA processors were complemented by external floating point processors, such as the 80287™ and 80387™ processors, which execute floating point instructions. These floating point processors included their own floating point register file, also referred to as the floating point register stack due to the manner in which floating point instructions reference individual registers within the floating point (FP) register file. In particular, the x87 architecture includes 8×80-bit floating point registers, comprising a 64-bit mantissa and a 16-bit characteristic (exponent). With the advent of the 80486™, the floating point unit was integrated into the processor itself along with the floating point register file.

Finally, the Pentium™ provided media enhancement technology, otherwise known as MMX instructions. These instructions provide enhanced performance for operations typically performed in multimedia applications, such as video and audio calculations. The MMX instructions operate on an 8×64-bit MMX register. However, for compatibility reasons discussed below, the 8 MMX registers are mapped, or aliased, onto the 8 floating point registers 506, as shown in FIG. 5. That is, from a programming perspective, the floating point and MMX register files comprise the same registers. Thus, a write of a value by an MMX instruction to register MM6 followed by a read by a floating point instruction of register FP6 would yield the value written by the MMX instruction.

The main reason for the design decision not to provide an architecturally separate MMX register file was to maintain compatibility with existing IA architecture operating systems, such as UNIX™, OS/2™ or Windows™. When performing task switches, these operating systems must save the state of the processor, which includes saving to memory the contents of both the integer and floating point register files. The addition of an architecturally distinct MMX register file would require a hugely expensive modification of already existing operating systems and application programs.

One result of the evolution of the IA described above is that programmers have developed certain conventions that they follow when developing software applications that employ floating point or MMX instructions. One convention is to mix floating point and MMX instructions only at the module or procedure level and to avoid mixing them at the instruction level. That is, programmers typically will code an entire procedure or module using only MMX (and integer instructions) without floating point instructions, or vice versa, rather than mixing MMX and floating point instructions in the same procedure. A switch from a floating point to an MMX instruction, or vice versa, is referred to as an instruction boundary event. Each transition between an FP instruction and an MMX instruction costs about 50 clocks. Thus, applications programmers typically attempt to minimize the number of instruction boundaries in their software applications.

A second convention is to leave all the floating point registers empty at the end of a section of floating point code (i.e., the tag bits of the floating point registers indicate they are empty), such as at the end of a floating point procedure. A third convention is similar to the second: leaving all the MMX registers empty at the end of an MMX procedure. The third convention is typically accomplished via the EMMS (empty multimedia state) instruction.

FIG. 6 shows a sample segment of source code illustrating two instruction boundary events. For example, execution of the instruction at L62 constitutes an instruction boundary event since the previous instruction FLDZ is a floating point instruction. Moreover, execution of the instruction at L66 constitutes an instruction boundary since only MMX- and FP-type instructions are considered; here, the ADD instruction at L65 is an integer-type instruction and so is not considered. Therefore, since the last MMX or FP instruction that executed prior to the FINIT instruction was EMMS, i.e., an MMX instruction, an instruction boundary exists at L66.

As discussed previously, the MMX and floating point units of an IA microprocessor share the same physical register file. However, connecting both a floating point unit 502 and an MMX unit 504 to floating point register file 506, as shown in FIG. 5, is costly in terms of wiring within a microprocessor, requiring additional metal layers to accomplish the necessary routing. Consider for example that 240 lines for data alone are required to interface the FP unit to the register file, two incoming 80-bit operand data buses and one outgoing 80-bit data bus. At least another 192 lines are needed to interface the MMX unit to the register file, two incoming 64-bit operand data buses and one outgoing 64-bit data bus. Add to this various control lines between the FP and MMX units and the register file. It is clear that the design of the FP and MMX hardware can quickly become a routing nightmare for the layout designer.

There is a need therefore for an architecture which can avoid the necessity of high density routing of signals on the computer chip when implementing the MMX technology. It is desirable to provide an architecture which provides fast transitions during the occurrence of an instruction boundary event.

SUMMARY OF THE INVENTION

In accordance with the invention a computing device includes a dual-register file architecture and a method for ensuring data coherency between an FP register file and an MMX register file includes monitoring write access to registers in the active register file and storing data indicative of which registers have been written to. Instructions to be executed are continually monitored for the occurrence of an instruction boundary event. Upon the occurrence of such event, control logic initiates an action to copy the registers in a first of the register files (i.e., the active register file) over to corresponding registers in a second of the register files, namely the receiving register file. Write-enable logic associated with each of the registers of the second register file is disabled based on the stored data for those registers in the first register file which have not been written to. Thus, an attempt to write into a write-disabled register will fail and thus preserve its original contents. This facilitates the control logic by obviating the need to make an extra check to determine whether a register should be copied or not. By disabling the appropriate registers, protection against unintended overwrites is automatically provided and only those registers which need to be overwritten to achieve coherence will be affected.

Circuitry in accordance with the invention includes an instruction decoder configured to detect MMX- and FP-type instructions. A data store is used to store the last MMX- or FP-type instruction that was decoded. Write detection logic monitors the occurrence of a write operation to a register, and a status register contains information as to which of the registers have been written to. The status register is coupled to write-enable logic associated with each register. The decoder detects when a currently executing MMX- or FP-type instruction differs from that indicated in the data store and asserts a signal indicating the occurrence of an instruction boundary event. The signal activates control logic to cause a transfer of data from one register file to the other in order to attain coherency between the two register files. The control logic generates signals which are coupled to the write-enable logic of the data-receiving registers. These signals along with the status register determine whether write operations to the receiving registers will succeed. Consequently, the control logic does not need to determine whether a transferring register was written to prior to moving the data over to the receiving register, thus simplifying the logic and keeping to a minimum the number of operations needed to attain coherency between register files.

BRIEF DESCRIPTION OF THE DRAWINGS

FIG. 6 is a listing of a sample code fragment.

DESCRIPTION OF THE SPECIFIC EMBODIMENTS

Figure 1:
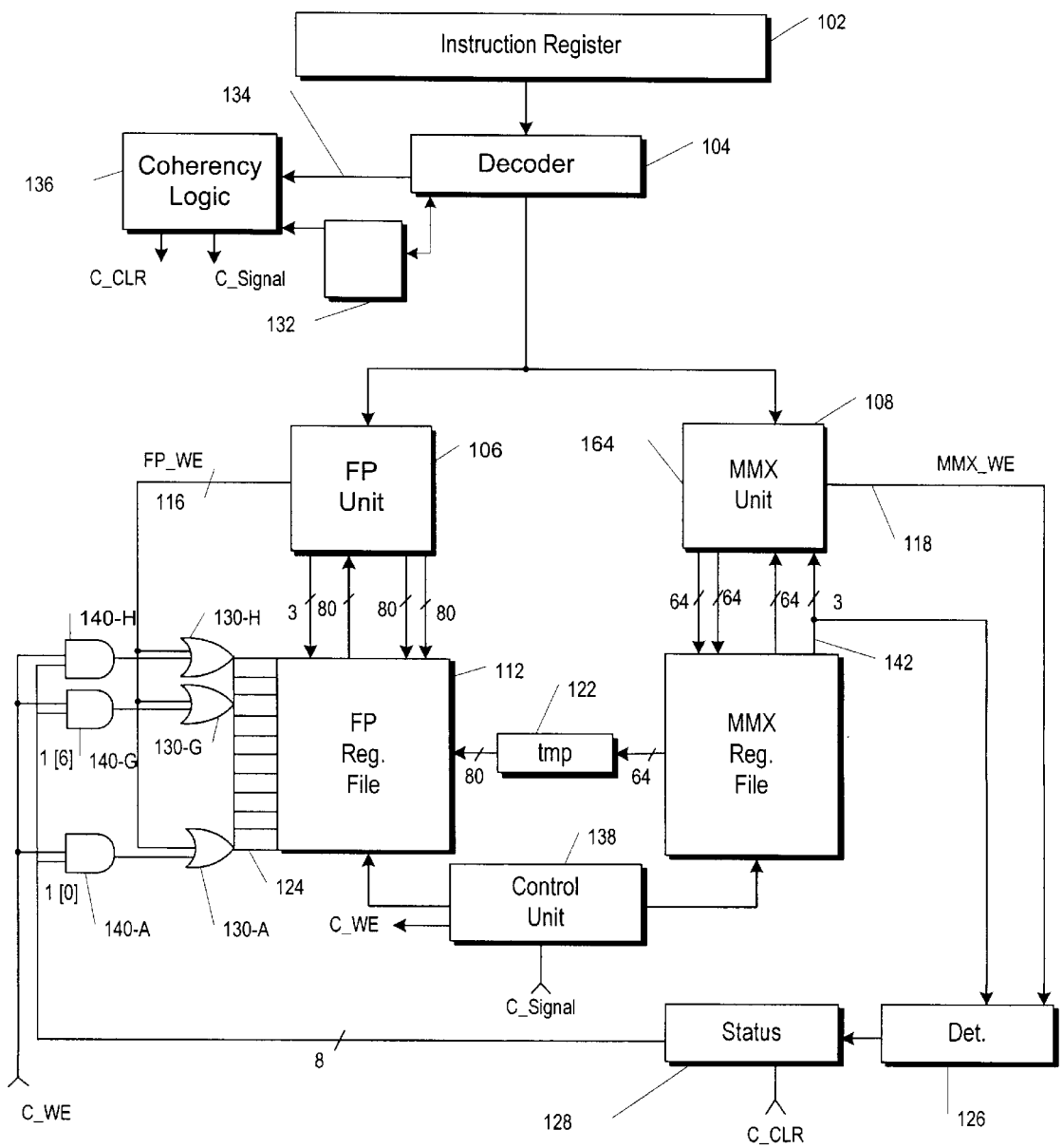
FIG. 1 is a block diagram showing a first embodiment, illustrating an exemplar of the logic for a one-sided coherency mechanism in accordance with the invention.

Referring to FIG. 1, the subsystem of the computing device relevant to the invention includes an instruction register 102, which is loaded with an instruction to be executed. This includes MMX and floating point (FP) instructions. Instruction register 102 feeds the instruction to a decoder 104 which decodes the instruction and produces control signals to operate the various logic comprising the computing device to perform the desired operation. In the case of an FP-type instruction, the control signals operate floating point unit 106 to effectuate the desired floating point operation. Similarly, in the case of an MMX-type instruction, the control signals feed into MMX unit 108.

FP unit 106 operates in conjunction with FP register file 112 to store and retrieve data during execution of an FP-type instruction. Data transfer between FP unit 106 and FP register file 112 takes place over eighty-bit data buses. A three-bit address bus serves to access each of the eight FP registers comprising register file 112. Associated with each register is write-enable logic shown collectively by circuitry 124. A write-enable signal 116 is generated by FP unit 106 when a write to a register in register file 112 is desired.

MMX unit 108 operates in conjunction with MMX register file 114 to store and retrieve data during execution of an MMX-type instruction. Data transfer between MMX unit 108 and MMX register file 114 takes place over 64-bit data buses. A three-bit address bus 142 provides access to each of the eight registers comprising the register file 114. As with FP register file 112, the MMX register file includes write-enable logic (not shown) corresponding to each of its constituent MMX registers. A write-enable signal 118 is generated by MMX unit 108 when a write to a register in register file 114 is desired.

Returning to decoder 104, additional logic is incorporated for tracking the occurrence of FP-type and MMX-type instructions. Logic (not shown) in the decoder detects when an FP-type or an MMX-type instruction has been decoded. An instruction type data store 132 is used in conjunction with decoder 104 to track the instruction type. Data store 132 receives from decoder 104 the instruction type for FP-type and MMX-type instructions. Preferably, the data store consists of a single bit where, by convention, a first logic state (e.g., logic 0) indicates an FP-type instruction and a second logic state (e.g. logic 1) indicates an MMX-type instruction. It is noted that data store 132 tracks only those instructions which are either FP- or MMX-type instructions; other instruction types interspersed between FP- or MMX-type instructions are ignored by decoder 104. Consider, for example, the code fragment listed in FIG. 6. Execution of the instruction at L621 causes the decoder to set the data store to indicate that an MMX-type instruction has been encountered. Now upon the subsequent execution of the ADD instruction, the contents of data store 132 will not be updated because it is neither an MMX- or an FP-type instruction. Moreover, the execution of the EMMS instruction will not affect the contents of the data store since it is an MMX-type instruction. However, when execution reaches the FINIT instruction at L66, the contents of data store 132 will be changed to indicate an FP-type instruction.

Returning to FIG. 1, coherency logic 136 produces signals c_clr and c_signal in response to receiving coherency signal 134 from the decoder. Coherency signal 134 is generated when decoder 104 decodes an FP- or MMX-type instruction that differs from the type stored in data store 132. Such an occurrence is referred to as an instruction boundary event, at which time coherency between the MMX register file and the FP register file must be achieved. This aspect of the invention will be discussed below.

The implementation details of data store 132 and coherency logic 136 are well within the skill of a person of ordinary skill in the relevant art. These elements could easily be a part of the decoder logic 104, but are shown as separate units to facilitate the discussion. It is understood that other implementations would be equally effective. This aspect of the invention is more fully disclosed in above-mentioned co-pending U.S. application Ser. No. 09/349,441, filed Jul. 9, 1999, entitled "Method and Apparatus for Tracking Coherency of Dual Floating Point and MMX Register Files."

Continuing with FIG. 1, the FP and MMX register files are coupled together by a temp register 122. As will be explained below, this facilitates the transfer of data from MMX register file 114 to FP register file 112. Control signal c_signal feeds into register files 112 and 114 and into temporary register 122 to effectuate the data transfer when coherency between the register files is desired. As can be seen, temporary register 122 receives all 64-bits from any one register of register file 114 and outputs 80-bits into FP register file 116. The incoming 64-bits are mapped to the lower 64 bits of the 80-bit output, while the remaining 16 upper bits are hardcoded to 0xFFFF by the logic comprising temporary register 122. This convention is required in order to conform with the MMX™ Technology architecture.

A control unit 138 provides control signals necessary to operate the FP and MMX register files to cause a transfer of data from register file 114 to register file 112. Control unit 138 asserts a write-enable signal c_we which feeds into AND gates 140-A through 140-H. The control unit performs its task in response to c_signal being asserted by coherency logic 136.

Write-detection logic 126 is coupled to MMX unit 108 to determine the occurrence of write operations to the MMX register file. The write-detection logic receives write-enable signal 118 and the address lines from MMX unit 108. From this, the write-detection logic can determine when and to which register a write operation is being made.

Write-detection logic 126 is coupled to a second data store 128 which contains information as to which of the constituent registers of register file 114 have been written. Preferably, data store 128 is an eight-bit status register where each bit corresponds to one of the eight constituent registers of the register file. Write-detection logic 126 sets the appropriate bit upon detecting a write operation to the register file. By convention, a logic 0 indicates the register has not been written, while a logic 1 indicates the register was written to.

Each of the eight bits of status register 128 is combined with write-enable signal c_we of control unit 138 via AND gates 140-A through 140-H. The outputs of the AND gates are OR'd with write-enable signal 116 from FP unit 106 through OR gates 130-A through 130-H. The outputs of the OR gates then feed into write-enable logic 124. Write access to each of the constituent registers of FP register file 112 is therefore independently controlled by the contents of status register 128 and by signal 116.

Figure 7:
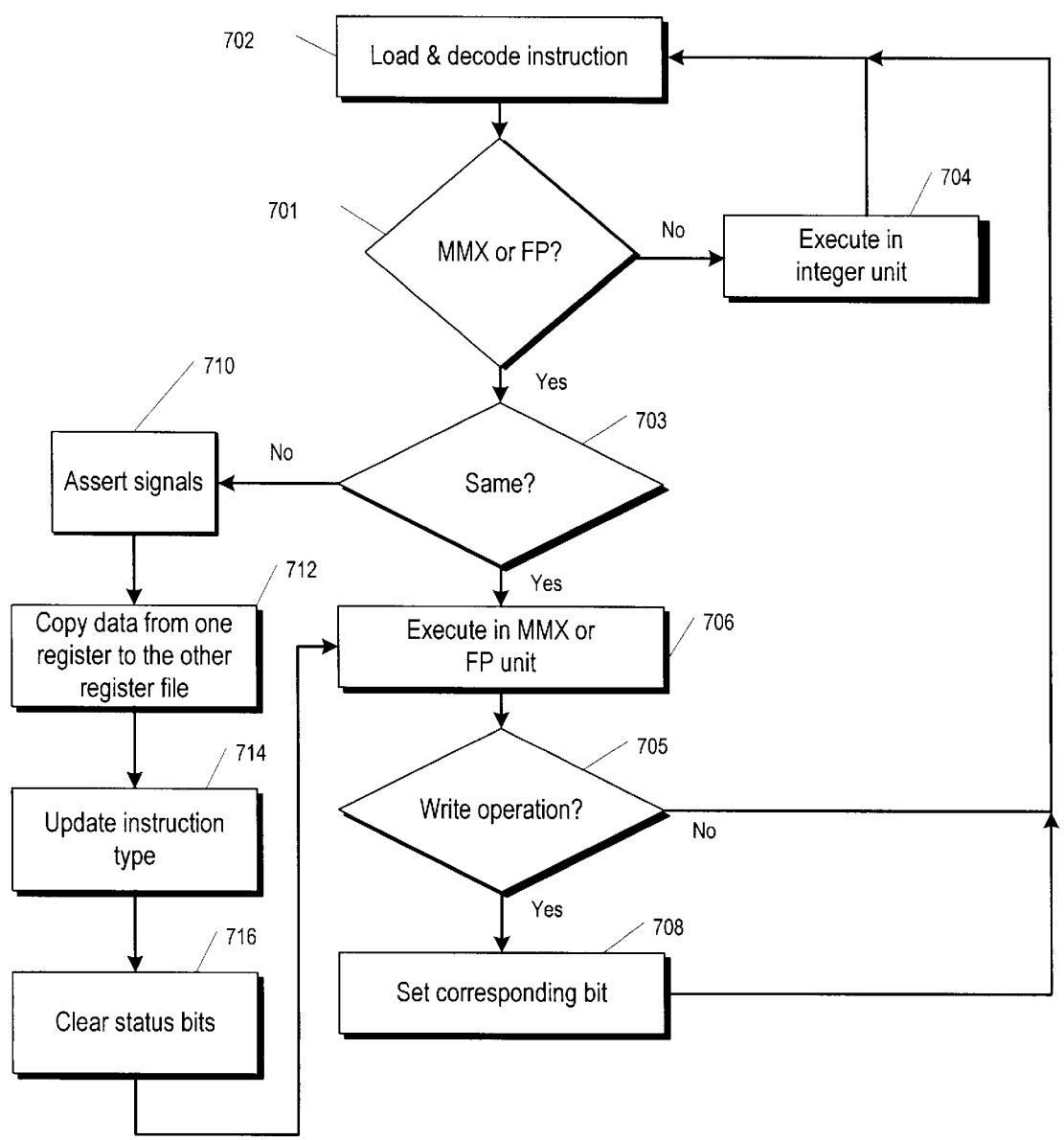
FIG. 7 is a flow chart of the processing in accordance with the invention.

Turn now to the flowchart of FIG. 7 for a discussion of the invention in conjunction with the logic shown in FIG. 1 and with reference to the code fragment shown in FIG. 6. Assume execution picks up with the instruction labeled L621. This instruction causes the transfer of data into MMX register 1, indirectly accessed through the ESI register. The decoder generates the necessary control signals accordingly to execute the instruction, step 702. If the instruction is neither an FP- or an MMX-type instruction, then an integer unit (not shown) is called into play to execute the instruction, steps 701, 704. If the instruction is either an FP- or an MMX-type instruction, then decoder 104 determines if the instruction type is the same as that stored in data store 132, steps 701, 703. As can be seen in FIG. 6, the instruction at L621 is the same type since the previously executed instruction (at L62) was an MMX-type instruction.

Execution of the instruction then proceeds in MMX unit 108 where the decoder has generated the control signals to set up the accessed data, assert the address on address lines 142, and assert the write enable signal on line 118 to cause a write into register file 114, step 706. Meanwhile, write-detection logic 126 monitors address lines 142 and detects the write operation when it senses that write-enable line 118 has been asserted, step 705. Write-detection logic 126 then sets the corresponding bit, namely bit one, in register 128 to indicate that MMX register 1 has been written to, step 708. The other bits in status register 128 will have been initialized to zero, as will be explained below. Processing then continues with the next instruction, indicated by the return to step 701.

Next at label L63, an ADD instruction is encountered. Since this type of instruction is neither an FP- nor an MMX-type instruction, decoder 104 does not affect the contents of data store 132. The instruction is simply performed, steps 702, 701, 704.

Execution continues until the instruction at label L66 is reached. Here, decoder 104 detects that the instruction type differs from the type stored in data store 132, steps 701, 703. Consequently, the decoder asserts coherency signal 134 which causes coherency logic 136 to assert signal c_signal, step 710. This in turn causes control unit 138 to issue control signals necessary to begin transferring, one at a time, the contents of each register in MMX register file 108 to the corresponding registers in FP register file, steps 710, 712.

Thus, the contents of MMX register 0 in register file 114 are read into temporary register 122. Control unit 138 then attempts to load into FP register 0 of register file 112 the contents of temporary register 122 by asserting write enable signal c_we. However, the corresponding bit (bit 0) in status register 128 not set since no write to MMX register 0 had occurred. In addition, FP_WE (signal 116) is not asserted since FP unit 106 is not performing a write. Consequently, although c_we is asserted, the contents of register 0 (the receiving register) in FP register file 112 will not be overwritten by the contents of temporary register 122.

The process is repeated where register 1 from MMX register file 114 is copied to temporary register 122. Control unit 138 again signals FP register file 112 to load into FP register 1 the contents of temporary register 122 by asserting write enable signal c_we. This time, the corresponding bit in status register 128 is set since a write to MMX register 1 occurred (at label L621, FIG. 6). Thus, the contents of register 1 in FP register file 112 will be overwritten by the contents of temporary register 122, thereby effectuating a transfer of register 1 from MMX register file 114 to register 1 of FP register file 112. Moreover, the datum that is transferred into the FP register file has 0xFFFF prepended to the 64 bits obtained from the MMX register file, recalling that temporary register 122 provides the hardcoded the 16-bit quantity.

This sequence is once again repeated for the six remaining registers in MMX register file 114. Note that the logic of control unit is quite straightforward, consisting of a series of move operations. The advantage here is that no decision or branching logic is required since control signal c_we and the write enable bits of status register 128 automatically determine whether a write into the corresponding floating point registers will occur. At the same time, the OR gates 130 provide normal operation of register file 112 by FP unit 106 when signal c_we is not asserted since the OR gates permit write-enable signal FP_WE to flow directly to the FP register file.

The operation provided by control unit 138 can be represented by the following code sequence:
MOV TMP, MMX0
MOV FP0, TMP
MOV TMP, MMX1
MOV FP1, TMP
MOV TMP, MMX2

MOV FP2, TMP
MOV TMP, MMX3
MOV FP3, TMP
MOV TMP, MMX4
MOV FP4, TMP
MOV TMP, MMX5
MOV FP5, TMP
MOV TMP, MMX6
MOV FP6, TMP
MOV TMP, MMX7
MOV FP7, TMP

In fact, as an alternative to control unit 138, assertion of signal c_signal can be tied to an interrupt line where the corresponding interrupt routine includes the foregoing sixteen line code fragment.

Continuing with FIG. 7, after copying the contents of one register file to the next, step 712, the new instruction type, namely FP-type, is stored in data store 132, step 714. Finally, in step 716, the control unit asserts a c_clr signal which causes status register 128 to be cleared for the next time around.

FIG. 1 discloses an embodiment for register file coherency only when the MMX registers are modified. It is a straightforward matter to apply the same circuitry to implement a computing device where register file coherency is achieved when the FP registers are modified. The circuitry disclosed in FIG. 1 would be reversed between the FP and the MMX circuits. Certain implementation implementation issues of doing this are addressed in the following discussion with respect to yet another embodiment of the invention.

Figure 2:
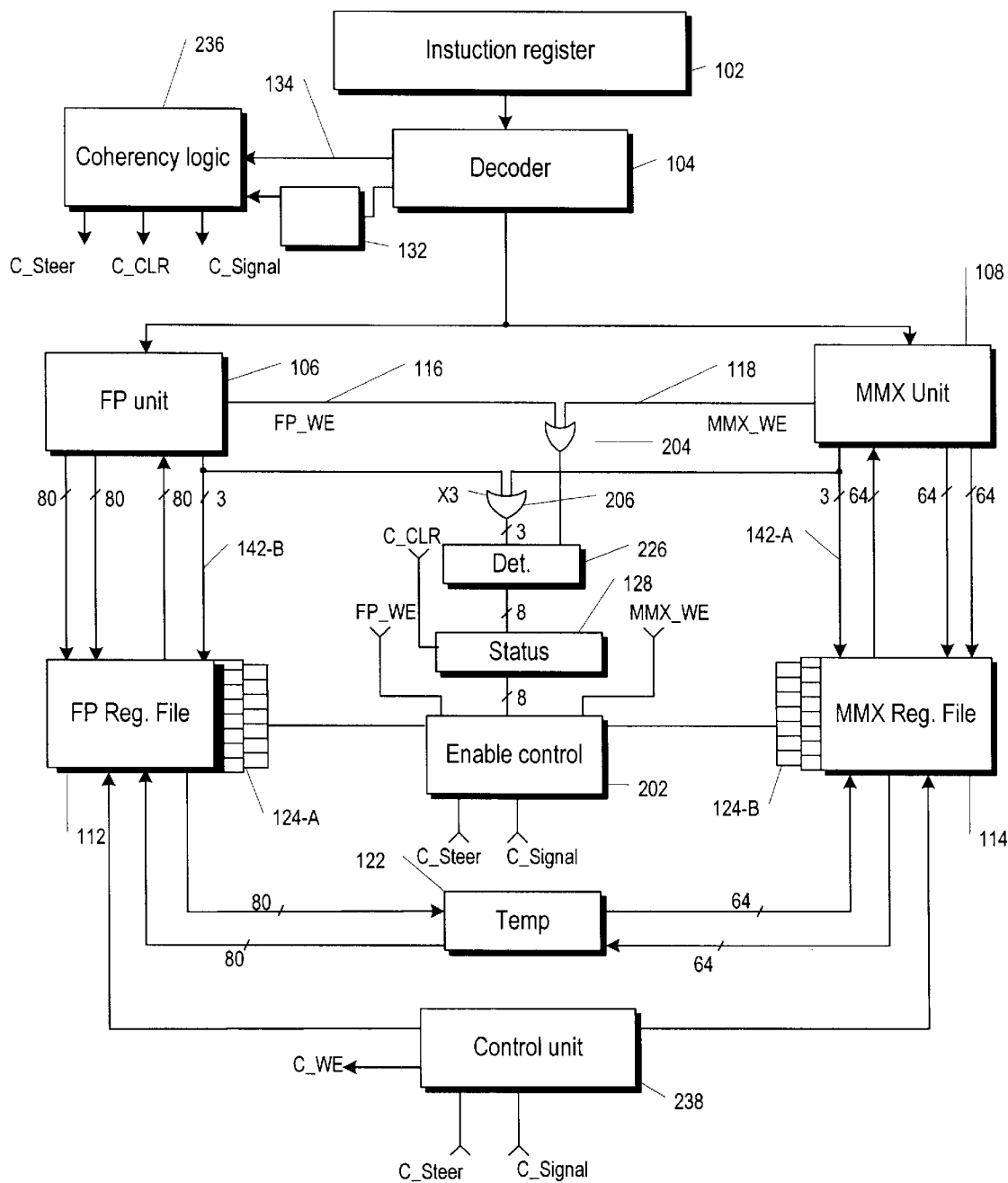
FIG. 2 is a block diagram showing a second embodiment, illustrating an exemplar of the logic for a two-sided coherency mechanism in accordance with the invention.

Turn now to FIG. 2 for an embodiment which allows for two-way coherency where coherency is attained when either of the two register files is written to. Elements which have already been discussed in connection with FIG. 1 retain their original reference numerals.

Instruction register 102 and decoder 104 have the same functionality as discussed in FIG. 1. The coherency logic 236 shown in FIG. 2 operates in the same manner as discussed with respect to FIG. 1, with the added function that a steering signal c_steer is generated. It's logic value depends on the instruction type contained in data store 132. The c_steer signal indicates which of the two possible occurrences of an instruction boundary event has taken place, i.e. either an FP-to-MMX or MMX-to-FP. The significance of this information will become clear in the discussion below.

Figure 3:
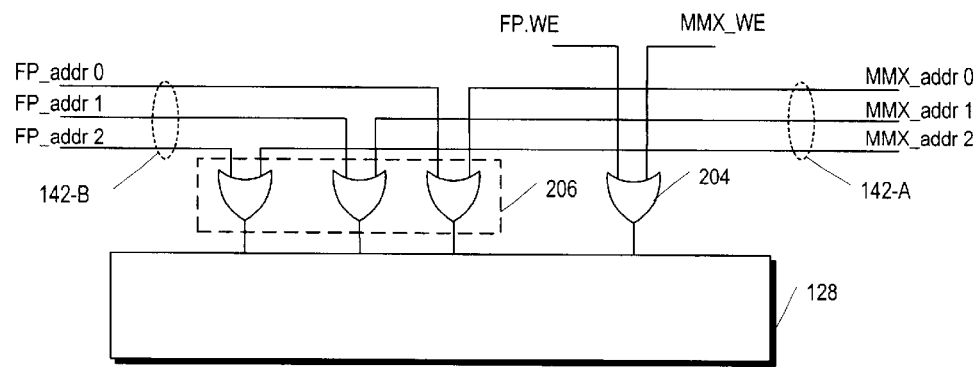
FIG. 3 shows additional detail of an OR gate structure illustrated in FIG. 2.

The write-enable lines 116 and 118 of both register files feed into an OR gate 204. Similarly, the address lines 142-A of register file 114 and address lines 142-B of register file 112 are OR'd together by OR gate 206. Turning for a moment to FIG. 3, it can be seen that OR gate 206 actually consists of three OR gates, each OR'ing together corresponding bit lines of the address lines from each of the register files.

Returning to FIG. 2, write-detection logic 226 receives the OR'd address bits and the OR'd write-enable signals. As before, write-detection logic 226 will set the bit in status register 128 corresponding to the register that has been written to. This embodiment requires that the address lines of the inactive register file be de-asserted so that the OR'ing of the address lines reflect only the state of the address lines of the active register file. In the context of this invention, an "active" register file is the register file corresponding to a currently executing FP or MMX instruction. For example, if an FP instruction is being executed, then the "active" register file is FP register file 112 while register file 114 is considered "inactive."

Control unit 238 has the added functionality of operating both FP and the MMX register files 106, 108 and temporary register 122 to transfer register contents thereof in both directions via the temporary register. Recall that in the case of data transfers from MMX register file 114 to FP register file 112, temporary register 122 provides a hardcoded 0xFFFF for the upper sixteen bits of an FP register. Additionally in the case of a data transfer from FP register file 112 to MMX register file 114, temporary register 122 filters out the upper sixteen bits of the characteristic, loading only the mantissa into an MMX register. Control unit 238 receives signals c_steer and c_signal and generates appropriate control signals to the FP and MMX register files and to the temporary register to effectuate the appropriate action.

The eight status bits from status register 128 and the two write-enable lines 116, 118 all feed into enable control logic 202. As will be explained, the enable control logic operating in conjunction with signals c_steer and c_we determine which of the eight registers in which of the two register files have been written to when an instruction boundary event occurs. In addition, enable control logic 202 permits normal operation of the register files during the time between instruction boundary events.

Figure 4:
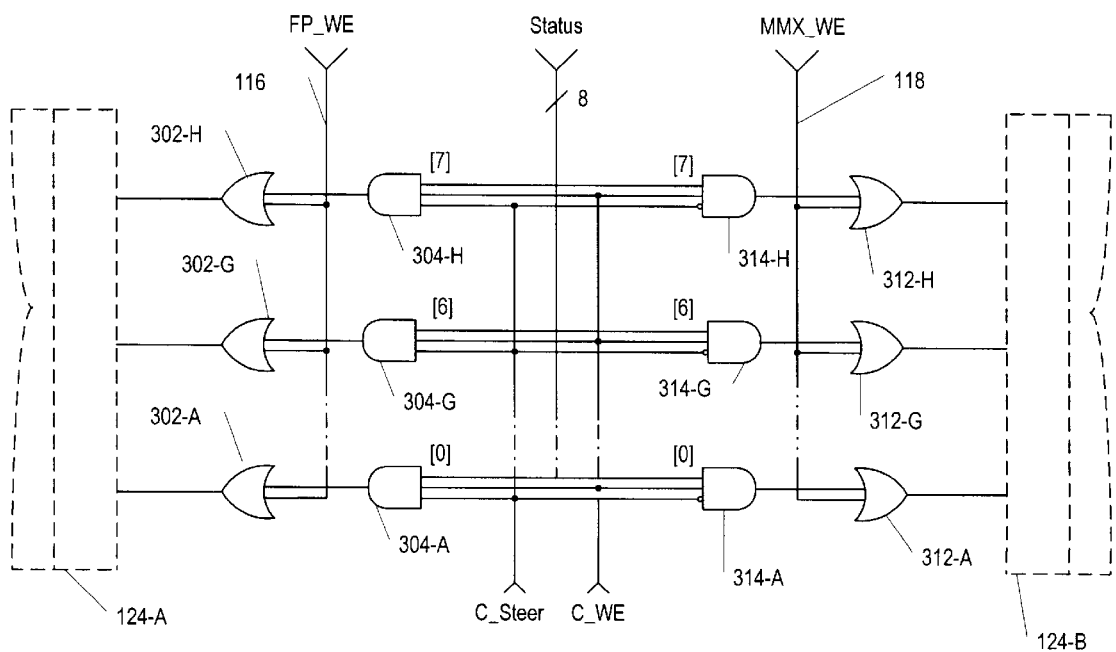
FIG. 4 shows additional detail of the enable control logic illustrated in FIG. 2.
Figure 5:
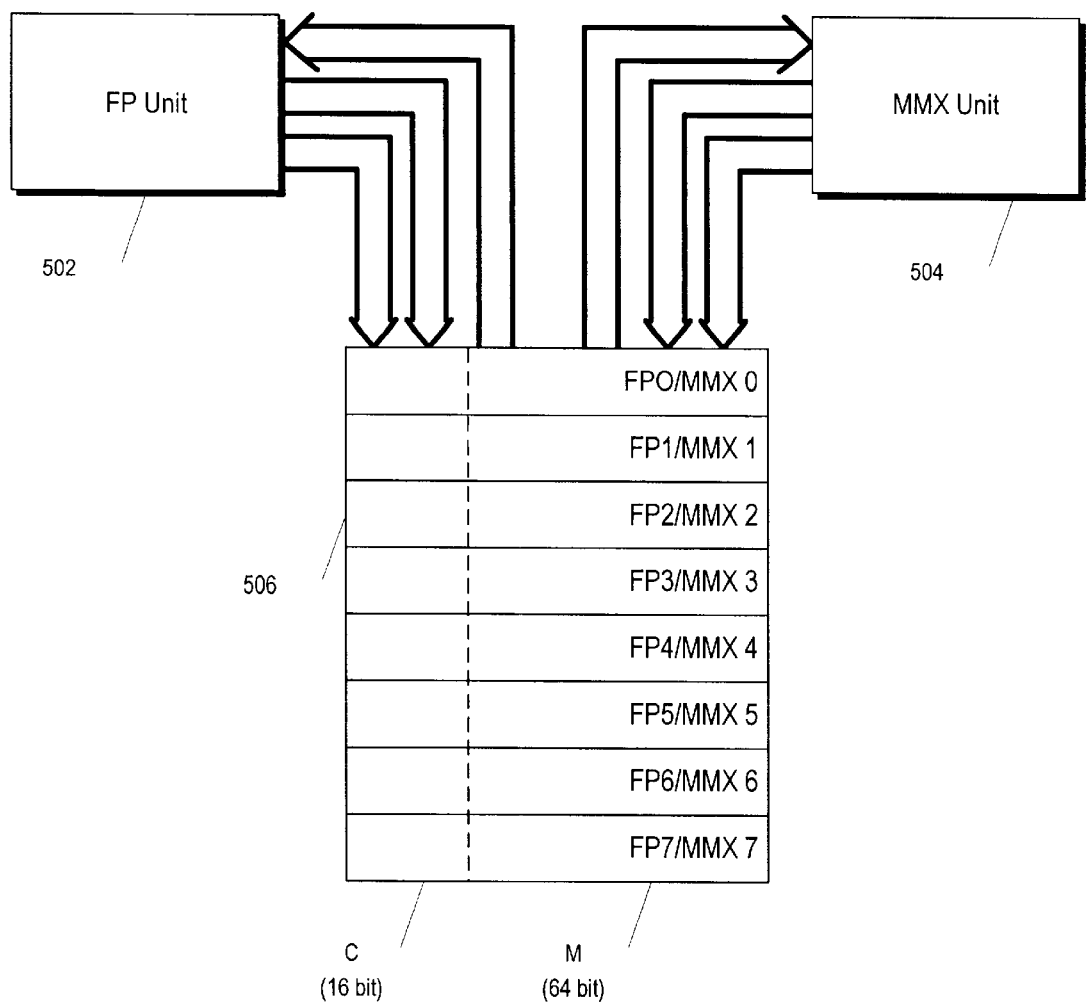
FIG. 5 shows the prior art configuration of the MMX register file.

An embodiment of enable control logic 202 is shown in FIG. 4. The write-enable signals FP_WE and MMX_WE respectively feed into OR-gates 302-A through 302-H and 312-A through 312-H. The outputs of these OR gates feed directly into write control logic 124-A and 124-B of the register files. Thus when the FP and MMX units 106, 108 operate in normal mode, their respective write enable signals 116, 118 in effect bypass the enable control logic.

The steering signal c_steer feeds into a bank of AND gates 304-A through 304-H. The signal also feeds into inverted inputs of a second bank of AND gates 314-A through 314-H. The write-enable signal c_we feeds into second inputs of both banks of AND gates. The incoming status bits from status register 128 feed into respective third inputs of the AND gates. Thus, bit 0 feeds into third inputs of gates 304-A and 314-A, bit 1 feeds into third inputs of gates 304-B and 314-B, bit 2 feeds into third inputs of gates 304-C and 314-C, and so on.

Operation of this embodiment of the invention also follows the sequence shown in the flow chart of FIG. 7. Consider again the code segment listed in FIG. 6. Picking up execution at L611, decoder 104 will have stored an FP-type indication into data store 132 at this point by virtue of earlier execution of the instruction al L61. Two affirmative responses in steps 701 and 703 results in execution of the instruction in the FP unit, step 706.

Next is the MMX instruction MOVQ which will result in a negative response at step 703, indicating the occurrence of an instruction boundary event. Decoder 104 asserts coherency signal 134, which results in coherency logic 236 asserting signals c_steer, and c_signal, step 710. In this embodiment of the invention, a determination must be made as to the direction in which the instruction switch occurred, namely MMX-to-FP or FP-to-MMX. The coherency logic can deduce this by inspecting the contents of data store 132. By convention, the data store is not updated until after the coherency operations have completed and so the instruction type represents the most recently executed instruction, in this case FP-type. Thus upon seeing FP-type stored in the data store, it follows that an FP-to-MMX instruction boundary has been encountered. As will become clear below, coherency logic 236 de-asserts signal c_steer for FP-to-MMX boundaries and asserts c_steer for MMX-to-FP boundaries.

Continuing on to step 712 the copy operation proceeds, and in this case it is desired that the FP register file be copied to the MMX register file. Status register 128 will contain a bit pattern indicating which of the FP registers have been written. Turning to FIG. 4, the status bits feeding into AND gates 314-A through 314-H are of interest; c_steer being de-asserted, AND gates 304-A through 304-H are effectively OFF. It can be seen therefore that the c_steer signal simply 'steers' the other signals (status bits and c_we) to either the first bank of AND gates or to the second bank of AND gates.

Continuing with step 712, when signal c_signal is asserted by coherency logic 236, control unit 238 is activated to control the register files to transfer their contents to the other. Signal c_steer indicates to the control unit which direction the transfer is to occur. Control unit 238 asserts c_we to enable writing to the registers. Operation of AND gates 314 automatically determine which of the write enable circuits will be enabled because the status bits dictate which AND gates are turned ON.

As discussed above in connection with FIG. 1, temporary register 122 includes logic which prepends 0xFFFF to data copied over from MMX register file 114 during an MMX-to-FP transition. However in this situation, temporary register 122 filters out the uppermost 16 bits of the data read from FP register file 112 upon transmitting it to the corresponding receiving register in MMX register file 114.

The process is repeated and upon completion of the data transfers, the instruction type in data store 132 is updated, step 714. Finally, the status bits are cleared in step 716 by assertion c_clr and control returns to step 702 to repeat the loop.

What is claimed is:

1. In an MMX-type computer architecture having a dual MMX and FP register file configuration, a method of ensuring coherency between said MMX and FP register files during the execution of MMX and FP instructions, first registers comprising one register file, second registers comprising the other register file, said first registers having one-to-one correspondence with said second registers, said method comprising:
    indicating the occurrence of write operations to said first registers;
    detecting an instruction boundary event; and
    upon detecting an instruction boundary event:
        disabling write operations to those of said second registers whose corresponding first registers have not been indicated as having been written to; and
        for each register of said first registers:
            reading data out of said each register; and
            writing said data to a corresponding register of said second registers, whereby said corresponding register is write-enabled only if said each register has been indicated as having been written to.

2. The method of claim 1 wherein said step of disabling write operations includes disabling write enable circuitry associated with each of said second registers.

3. The method of claim 1 wherein said step of indicating is a step of setting a bit in a status register, said status register having a bit corresponding to each of said first registers.

4. The method of claim 3 wherein said step of setting a bit includes monitoring accesses to each of said first registers.

5. The method of claim 3 wherein said step of disabling write operations includes feeding the logic state of said bits of said status register into a write enable circuit associated with each of said second registers in a manner that said write enable circuits are enabled and disabled on the basis of the logic states of said bits.

6. The method of claim 1 wherein said step of reading is a step of transferring said data into a temporary register and said step of writing is a step of transferring said data out of said temporary register.

7. The method of claim 6 further including determining whether said instruction boundary event is an FP-to-MMX transition or an MMX-to-FP transition.

8. The method of claim 7 wherein said step of writing includes prepending 0xFFFF to said data if said instruction boundary event is an MMX-to-FP transition.

9. The method of claim 7 wherein said step of reading includes filtering out the upper sixteen bits of said data if said instruction boundary event is an FP-to-MMX transition.

10. In a computing device having an MMX register file and a floating point register file, one of which is a first register file and the other of which is a second register file, wherein registers comprising said first register file have a one-to-one correspondence to registers comprising said second register file, apparatus for ensuring data coherency between said register files, comprising:
    indication logic for generating information indicating write operations to registers of said first register file;
    a data store, coupled to receive said information from said indication logic thereby identifying which registers have been written to;
    detection logic for detecting the occurrence of an instruction boundary event and asserting an event signal in response to such an event;
    control logic, coupled to receive said event signal, for reading out the contents of said registers in said first register file and writing the contents to corresponding registers in said second register file in response to said event signal being asserted; and
    write enable logic operatively coupled to said second register file and to said data store, said write enable logic effective for enabling and disabling write operations to each register in said second register file depending on the contents of said data store, whereby contents of registers in said second register file will be overwritten only if the corresponding registers of said first register file have been written to.

11. The computing device of claim 10 wherein said data store is a status register having a plurality of bits, each bit corresponding to each register in one of said register files, each bit coupled to said write enable logic, said write enable logic further effective for enabling and disabling write operations on the basis of the logic state of said bits.

12. The apparatus of claim 10 wherein said detection logic includes first logic effective for detecting whether an FP-to-MMX or an MMX-to-FP instruction boundary has occurred.

13. The apparatus of claim 12 further including a temporary register coupled between said first register file and said second register file, said temporary register effective for receiving data from said MMX register file and prepending 0xFFFF to a received datum in response to detection of an MMX-to-FP instruction boundary, said temporary register further effective for receiving data from said FP register file and filtering out the upper sixteen bits of a received datum in response to detection of an FP-to-MMX instruction boundary.

14. The apparatus of claim 10 further including an instruction decoder and a second data store, said decoder effective for decoding computer instructions including MMX-type and floating point-type instructions, said detection logic coupled to said decoder and said second data store and effective for storing an instruction type in said second data store when an MMX-type instruction or a floating point-type instruction has been decoded, said detection logic asserting said event signal when a currently decoded MMX-type or floating point-type instruction does not match said instruction type stored in said second data store, thus indicating an occurrence of an instruction boundary event.

15. The apparatus of claim 10 wherein said indication logic includes first logic effective for monitoring which registers of said first register file are being written to, said data store comprising a storage element corresponding to each of said registers, said first logic further effective for storing a first logic value in the corresponding one of said storage elements when a register is written to.

16. The apparatus of claim 15 wherein said data store is an N-bit status register wherein N is a number equal to the number of registers comprising one of said register files, each bit coupled to said write enable logic, said write enable logic further effective for enabling and disabling write operations on the basis of the logic state of said bits.

17. The apparatus of claim 15 wherein said first logic is further effective for monitoring address lines coupled to said first register file, thereby determining which registers have been written to.

18. A computing device comprising:
an instruction decoder effective for decoding instructions including MMX instructions and floating point (FP) instructions, said decoder including event logic for signaling an occurrence of an instruction boundary event;
an FP unit for performing floating point operations;
an FP register file coupled to said FP unit for storing and retrieving FP data, said FP register file comprising a plurality of FP registers, each of said FP registers having associated write enable logic;
an MMX unit for performing MMX operations;
an MMX register file coupled to said MMX unit for storing and retrieving MMX data, said MMX register file comprising a plurality of MMX registers equal in number to said FP registers, each of said MMX registers having associated write enable logic, each of said MMX registers having a one-to-one correspondence with said FP registers;

write detection logic for detecting write operations to said FP registers and said MMX registers, said write detection logic including a data store of bits equal in number to said FP registers, said bits thereby having a one-to-one correspondence with said FP registers and said MMX registers, said write detection logic effective for storing a first logic value in a bit when its corresponding FP register or MMX register is written to; and control logic, coupled to said instruction decoder, for reading out the contents of said FP or MMX registers and writing it to the other of said registers in response to detection of an occurrence of an instruction boundary event;

said write enable logic of said FP and MMX registers coupled to said bits of said data store, said write enable logic effective for disabling write operations to its associated FP or MMX register when its corresponding bit is set to said first logic value.

19. The computing device of claim 18 wherein said FP unit includes an FP write enable line and FP address lines coupled said FP register file and said MMX unit includes an MMX write enable line and MMX address lines coupled to said MMX register file; wherein said write detection logic is coupled to said FP and MMX write enable lines and to said FP and MMX address lines.

20. The computing device of claim 18 wherein said event logic is further effective for detecting the occurrence an FP-to-MMX instruction boundary and an MMX-to-FP instruction boundary.

21. The computing device of claim 20 further including a temporary register coupled between said FP register file and said MMX register file, said temporary register effective for receiving data from said MMX register file and prepending 0xFFFF to a received datum in response to detection of an MMX-to-FP instruction boundary, said temporary register further effective for receiving data from said FP register file and filtering out the upper sixteen bits of a received datum in response to detection of an FP-to-MMX instruction boundary.

* * * * *